United States Patent [19]

Sumii et al.

[11] Patent Number: 5,503,781
[45] Date of Patent: Apr. 2, 1996

[54] MICROENCAPSULATION PROCESS

[75] Inventors: Masaaki Sumii, Sakai; Yasuyuki Yoshimura, Ibaraki, both of Japan

[73] Assignee: Sakura Color Products Corporation, Osaka, Japan

[21] Appl. No.: 212,785

[22] Filed: Mar. 15, 1994

[30] Foreign Application Priority Data

Mar. 17, 1993 [JP] Japan .................................. 5-056247

[51] Int. Cl.$^6$ ............................... B01J 13/18; B41M 5/28
[52] U.S. Cl. ........................... 264/4.7; 252/600; 503/215
[58] Field of Search ............................ 264/4.7; 252/600; 503/215

[56] References Cited

U.S. PATENT DOCUMENTS

| | | | |
|---|---|---|---|
| 4,100,103 | 7/1978 | Foris et al. | 264/4.7 |
| 4,409,156 | 10/1983 | Hoshi et al. | 264/4.33 |
| 4,444,699 | 4/1984 | Hayford | 264/4.7 |
| 4,490,313 | 12/1984 | Brown et al. | 264/4.7 |
| 4,936,916 | 6/1990 | Shinmitsu et al. | 264/4.7 X |

FOREIGN PATENT DOCUMENTS 1-164433  6/1989  Japan ..................................... 264/4.7

*Primary Examiner*—Richard D. Lovering
*Attorney, Agent, or Firm*—Larson and Taylor

[57] ABSTRACT

This invention provides the following production process.

A microencapsulation process comprising encapsulating a hydrophobic core material with a melamine-formaldehyde polycondensate resin in the presence of an anionic macromolecular electrolyte system, characterized in that, as said anionic macromolecular electrolyte system, (A) vinyltoluenesulfonic acid-maleic anhydride copolymer and
(B) methyl vinyl ether-maleic anhydride copolymer are used in a weight ratio A:B of 50:50–90:10.

5 Claims, No Drawings

MICROENCAPSULATION PROCESS

FIELD OF THE INVENTION

This invention relates to a process for producing microcapsules.

BACKGROUND OF THE INVENTION

The microcapsule is in broad use in the fields of thermocolor materials, perfumery, agrochemicals, pressure-sensitive copying and recording materials, etc. The known microencapsulation technology includes in-situ polymerization, interfacial polymerization, coacervation, in-liquid drying, spray drying and other methods. Among these methods, in-situ polymerization is advantageous that it does not require much rigorous production control and the necessary encapsulation can be easily achieved in a comparatively short time.

Particularly the in-situ polymerization process using an amino resin as the wall material is conducive to microcapsules of improved capsule strength. Therefore, this process is predominating over other processes in the manufacture of microcapsules for the fields of use requiring a high core-retaining property. Many development and improvement efforts have been made in connection with water-soluble polymers (system modifiers) for use as electrolytes in this method and, by way of illustration, a process involving the use of an anionic polymer such as a vinylsulfonic acid polymer, an ethylene-maleic anhydride polymer or the like as the electrolyte is known.

Such technologies for the manufacture of microcapsules expected to have a sufficient core-retaining property must provide for sufficient both emulsifying power and wall-forming power, in particular. The emulsifying power is the ability of the system to emulsify a hydrophobic core substance into finely divided droplets and has an important bearing on the particle size and, hence, on the pressure resistance of capsules. The wall-forming power is the ability of the system to marshall the amino resin or the like separating from the aqueous phase of a polycondensation system onto the interface with the core droplet to build a tough resin film in situ and is related to the heat resistance, among others, of microcapsules.

The in-situ polymerization technology has room, however, for improvement in regard to these two essential qualities. Thus, since the conventional process does not provide for a sufficient emulsifying effect, the resulting capsules are comparatively large in diameter and, hence, liable to collapse and fail to retain the core material. Moreover, because the wall-forming power of the process is also inadequate, an amino resin polycondensation reaction system is ready to undergo gelation to interfere with undeterred progress of subsequent polycondensation and, hence, with formation of microcapsules. Even if microcapsules could be formed at any rate, the particle size is large and broad in distribution and the capsules are deficient in resistance to pressure and heat.

SUMMARY OF THE INVENTION

The primary object of this invention is to provide a microencapsulation process insuring particularly improved emulsification and wall-forming effects.

This invention is, therefore, directed to a microencapsulation process comprising encapsulating a hydrophobic core substance with a melamine-formaldehyde polycondensate wall resin in the presence of an anionic polymer electrolyte system characterized in that (A) vinyltoluenesulfonic acid-maleic anhydride copolymer and (B) methyl vinyl ether-maleic anhydride copolymer are used in a weight ratio A:B of 50/50–90/10 as said anionic polymer electrolyte system.

DETAILED DESCRIPTION OF THE INVENTION

This invention has been conceived and developed on the basis of the finding that when a couple of certain copolymers, which are anionic macromolecular electrolyte compounds, are used together in a herein defined ratio as a system modifier for in-situ amino resin polymerization, outstanding effects can be obtained in terms of emulsifying power and wall-forming power and that the resulting microcapsules have very desirable characteristics, particularly improved resistance to pressure and heat.

This invention is now described in detail.

First, a core-forming material is added to an aqueous solution of two system modifier anionic macromolecular elecrolytes and the mixture is stirred in the conventional manner. The system modifier macromolecular electrolytes for use in combination in accordance with this invention are vinyltoluenesulfonic acid-maleic anhydride copolymer (hereinafter called Copolymer A) and methyl vinyl ether-maleic anhydride copolymer (hereinafter called Copolymer B). As the vinyltoluenesulfonic acid-maleic anhydride copolymer, one having the following basal structure can generally be employed.

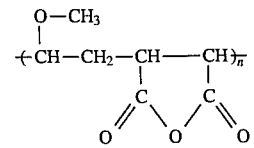

For the purposes of this invention, the molecular weight of this copolymer is generally about 5000–500000 and preferably about 10000–400000 but this range is not so critical. However, if the molecular weight is too large, gelation (viscosity buildup) occurs to interfere with microencapsulation. Conversely when the molecular weight is too small, both the emulsifying power and wall-forming power of the system are sacrificed.

Regarding the composition of this vinyltoluenesulfonic acid-maleic anhydride copolymer, a suitable proportion of the maleic anhydride unit can be selected according to the intended use of microcapsules, the core material to be encased and other conditions. The degree of sulfonation of the above polymer can be generally not less than 80% but may be less than 80% depending on the intended use of microcapsules.

As the methyl vinyl ether-maleic anhydride copolymer, one having the following basal structure can be employed.

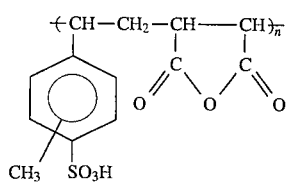

The molecular weight of this copolymer is generally about 10000~500000 and preferably about 20000~400000, although this range is not so critical. However, if the molecular weight is too large, thickening of the system occurs to interfere with microencapsulation. On the other hand, if the molecular weight is too small, both the emulsifying and wall-forming powers of the system are adversely affected. In the above methyl vinyl ether-maleic anhydride copolymer, the proper proportion of the maleic anhydride unit can be selected according to the intended use of microcapsules, the core material to be encapsulated and so on.

These two copolymers are generally used as an aqueous solution, in which case the solution may be of the free copolymers or of their salts either in part or as a whole. The salts mentioned above include alkali metal salts, e.g. sodium, potassium and lithium salts, ammonium salts and lower amine salts, to name but a few examples.

The above aqueous solution is prepared by dissolving said two copolymers in water. The weight ratio of Copolymer A to Copolymer B is 50/50–90/10 and preferably 60/40–80/20. If the proportion of Copolymer A is too large, the mean size of microcapsules is increased and their heat resistance decreased, although microencapsulation can proceed more or less satisfactorily. On the other hand, if the proportion of Copolymer A is too small, gelation tends to occur to interfere with microencapsulation. Moreover, should the desired microecapsulation be accomplished, the mean size of microcapsules will be too large and their heat resistance be unsatisfactory. The combined concentration of the two copolymers in said aqueous solution is generally about 1–20% w/w and preferably about 2–15% w/w. If the concentration is less than 1%, no sufficient emulsifying effect can be obtained. If it exceeds 20%, gelation tends to take place.

As the core material, substantially any solid or liquid substance that is only sparingly soluble or insoluble in water can be employed, so long as it does not adversely affect the effect of the invention. In view of the characteristics of microcapsules that can be obtained by the process of this invention, it is advantageous to employ core substances which are intended for uses demanding a sufficient core-retaining performance. As such core substances may be reckoned substances which are used in thermochromic materials, photochromic materials, liquid crystals and so forth. Thus, referring to (1) thermochromic materials, there can be mentioned those including chromogenic organic compounds, electron acceptor compounds, desensitizers and so forth.

(a) The chromogenic organic compounds include diaryl phthalides such as crystal violet lactone, malachite green lactone, etc., polyaryl carbinols such as Michler's hydrol, crystal violet carbinol, malachite green carbinol, etc., leucoauramines such as N-(2,3-dichlorophenyl)leucoauramine, N-benzoylauramine, N-acetylauramine, etc., indolines such as 2-(phenyl-iminoethylidene)- 3,3-dimethylindoline etc., spiropyrans such as N-3,3-trimethylindolinobenzospiropyran, 8-methoxy-N- 3,3-trimethylindolinobenzospiropyran, etc., and fluorans such as 2'-((2-chlorophenyl)amino-6' -(dibutylamino)-spiro(isobenzofuran-1(3H), 9'-(9H)-xanthen)- 3-one, 3-diethylamino-6-methyl-7-chlorofluoran, 3-dimethylaminobenzo(a)fluoran, 3-diethylaminobenzo(a)-fluoran, 3,6-diphenylaminofluoran, 3-amino-5-methylfluoran, 2-methyl-3-amino-6,7-dimethylfluoran, 2-bromo-6 -cyclohexylaminofluoran, 6'-(ethyl(4-methylphenyl)amino)- 2'-(N-methylphenylamino)-spiro(isobenzofuran-1(3H),9 -(9H)xanthen)-3-one, etc.

(b) The electron accepting compounds include phenol compounds such as bisphenol A, p-phenylphenol, dodecylphenol, o-bromophenol, ethyl p-hydroxybenzoate, methyl gallate, phenolic resin, etc., various metal salts of said phenol compounds (salts with Na, K, Li, Ca, Zn, Al, Mg, Ni, Co, Sn, Cu, Fe, Ti, Pb, Mo, etc.), aromatic carboxylic acids or aliphatic carboxylic acids of 2–5 carbon atoms, such as phthalic acid, benzoic acid, acetic acid, propionic acid, etc., metal salts of carboxylic acids, such as sodium oleate, zinc salicylate, nickel benzoate, etc., acid phosphoric esters and their metal salts, triazole compounds such as 1,2,3-triazole, 1,2,3-benzotriazole, etc., thiourea and its derivatives such as diphenylthiourea, di-o-toluylthiourea, etc., halohydrins, benzothiazoles and so forth.

(c) The desensitizers include alcohols such as n-cetyl alcohol, n-octyl alcohol, cyclohexanol, hexylene glycol, etc., esters such as ethyl myristate, stearyl laurate, dioctyl phthalate, etc., ketones such as methyl hexyl ketone, benzophenone, stearone, etc., ethers such as butyl ether, diphenyl ether, distearyl ether, etc., acid amides such as oleamide, stearamide, lauric N-octylamide, caproic acid anilide, etc., fatty acids of not less than 6 carbon atoms and aromatic hydrocarbons (thiols, sulfides, sulfoxides, sulfones, azomethines, aliphatic primary amine salts, etc.).

(2) The photochromic materials include (a) spirooxazines such as 1,3,3-trimethyl-spiroindolinenaphthoxa zine, 1,3,3, 5-tetramethyl-spiroindolinenaphthoxazine, 1-(4' -methylphenylmethyl)-3,3-dimethyl-spiroindolinenaphthoxazine, etc., (b) spiropyrans such as 1,3,3-trimethylindolino-6-nitrobenzopyrrylspiropiran, 1,3,3 -trimethylindolino-β-naphthospiropiran, 1-n-butyl-3,3 -dimethylindolino-β-naphthospiropyran, etc., (c) dithizone complexes (complexes of dithizone with mercury, palladium, silver, zinc, etc.), (d) salicylideneanilines such as 2-chloro-salicylideneaniline etc., (e) inorganic compounds such as mercuric chloride, silver halides, etc., among others.

(3) The liquid crystals include (a) nematic liquid crystals such as ρ-methoxy-ρ'-butylazobenzene, ρ-cyanophenyl-ρ'-butylbenzoate, ρ-pentyl-ρ'-cyanobiphenyl, etc. and (b) cholesteric liquid crystals such as cholesterol nonanoate, cholesterol chloride, cholesterol acetate, etc., among others.

The proportion of the core substance relative to 100 parts by weight of the above aqueous solution is generally not more than about 200 parts by weight and preferably not more than 100 parts by weight. If the proportion exceeds 200 parts by weight, the gelation problem tends to occur. The lower limit depends on the desired yield of microcapsules, among other factors. However, if the proportion of the core substance is too small, the production efficiency is sacrificed, although the performance characteristics of microcapsules are not affected. Therefore, the proportion of generally about 10 parts by weight and preferably about 50 parts by weight can be used.

The thus-obtained aqueous system comprising said Copolymers A and B and core substance is stirred and emulsified by the conventional emulsification technique. The emulsification temperature is not critical and can be the optimum temperature for the core substance. For example, assuming that the core substance is a wax, the emulsification is carried out at a temperature beyond its melting point.

Then, a wall precursor material is added to this emulsified aqueous solution and the mixture is stirred. As the wall precursor material, melamine and formaldehyde, methylolmelamine monomer, methylolmelamine prepolymer, methylated methylolmelamine monomer, methylated methylolmelamine prepolymer, or a mixture thereof, among others, can be employed. When melamine and formaldehyde are used, melamine is added and dissolved in an aqueous solution of formaldehyde with heating and the resulting prepolymer is put to use. The preferred ratio of melamine to formaldehyde is generally about 1/1.5–1/5.

The amount of the wall precursor material varies with the type and amount of core substance and desired characteristics of microcapsules, among other factors, but for most purposes is preferably about 5–50 parts by weight relative to 100 parts by weight of the core substance. In relation to the above-mentioned system modifier, the proportion of the wall precursor material may generally be about 20–3000 parts by weight relative to 100 parts by weight of the system modifier. If the proportion is less than 20 parts by weight, no adequate wall formation can be expected. On the other hand, if the proportion exceeds 3000 parts by weight, the gelation tendency of the system is increased to interfere with microencapsulation.

The stirring and other conditions may be similar to those of conventional in-situ polymerization. Thus, generally the reaction is conducted at about 40°–80° C. for about 1–3 hours and the pH of the system is adjusted to about 4.5–5.5. The adjustment of pH can be made using a known pH control agent such as acetic acid, hydrochloric acid, citric acid, sodium hydroxide, sodium carbonate and so on. It is sufficient that the system following addition of the wall precursor be within the above range and the pH control agent may be added either before or after the addition of the core substance or the wall precursor material.

After stirring, the system is cooled to around room temperature, whereupon a microcapsule dispersion is obtained. The microcapsules are then separated and dried in the conventional manner to provide the objective microencapulated product.

By the production process of this invention, excellent emulsification and wall-forming effects which have not been achieved by the conventional in-situ polymerization technology can be successfully realized.

As a consequence, various characteristics such as pressure resistance and heat resistance can be improved to provide microcapsules which will not collapse readily on application of heat and pressure. Such microcapsules can be used with advantage in fields where a high core-retaining power is required, particularly thermochromic materials, photochromic materials and liquid crystals.

EXAMPLES

The following examples are further illustrative of the outstanding features of the invention.

The methods used for the evaluation of microcapsules in the examples were as follows.

(a) Condition of the microencapsulation reaction system: The condition was visually evaluated. Any system undergoing gelation with a marked increase in viscosity after addition of the wall-forming precursor material is regarded as unacceptable.

(b) Average particle size: The particle size was determined with a particle size distribution analyzer (centrifugal sedimentation method). The higher the emulsifying power of the system modifier, the greater is the particle size uniformity. The smaller the mean particle diameter is, the less frequent is the rupture of the microcapsules due to pressure or the like.

(c) Heat resistance: Using the microcapsule dispersion, white Kent paper was printed by means of a 100 mesh screen, followed by drying. The dried paper was held in an oven at 180° C. for 30 minutes and the color difference retention rate relative to the color difference before the oven treatment was determined to evaluate the heat resistance. The color difference retention rate was calculated by means of the following equation.

The color difference retention (%) =

$$\frac{\sqrt{(L*1T - L*2T)^2 + (a*1T - a*2T)^2 + (b*1T - b*2T)^2}}{\sqrt{(L*1S - L*2S)^2 + (a*1S - a*2S)^2 + (b*1S - b*2S)^2}}$$

where $L*$ denotes brightness, $a*$, $b*$ are chromaticness indices, $L*1S$, $a*1S$, $b*1S$ represent the chromaticity values ($L*a*b*$ at 10° C.) and $L*2S$, $a*2S$ and $b*2S$ represent bleached chromaticity values ($L*a*b*$ at 55° C.) before the test; $L*1T$, $a*1T$ and $b*1T$ represent the chromaticity values ($L*a*b*$ at 10° C.) and $L*2T$, $a*2T$ and $b*2T$ represent the bleached chromaticity values ($L*a*b*$ at 55° C.) after the test.

When the microcapsule wall is vulnerable to heat, the diffusion of the core substance out of the capsule is increased and its thermochromic function is impaired, with the result that the chromic response is diminished from the value before the test and the color difference retention rate is decreased.

(d) Pressure resistance:

The paper printed with the microcapsule dispersion in the same manner as in the heat resistance test was machine-pressed at 100 kg/cm² for 1 minute and the color difference retention rate relative to the color difference before the test was determined to evaluate the pressure resistance. When microcapsules are vulnerable to pressure, the chromic response is sacrificed and the color difference retention rate is decreased.

Example 1

Four (4) grams of vinyltoluenesulfonic acid-maleic anhydride copolymer (mol. wt. ca. 45000) and 1 g of methyl vinyl ether-maleic anhydride copolymer (mol. wt. ca. 100000) were dissolved in 95 g of water with stirring at 70° C. for 2 hours. The solution showed a pH value of 2.2. Then, 20% aqueous sodium hydroxide solution was gradually added to bring the pH of the solution to 4.0 (Solution A). On the other hand, 4 g of 3-diethylamino-6-methyl-7-chlorofluoran and 8 g of bisphenol A were dissolved in 70 g of cetyl alcohol with stirring at 100° C. (Solution B). Furthermore, 6 g of melamine was dissolved in 15 g of 37% formalin with stirring at 70° C. (Solution C).

Then, Solution B was added to Solution A at 70° C. and the mixture was emulsified with stirring until fine droplets were obtained. To this emulsion was added Solution C, the wall precursor material, in small portions. The mixture showed a pH value of 5.0. The mixture was further stirred at 70° C. for 1 hour, after which it was cooled gradually to room temperature to provide a microcapsule dispersion. Then, the microcapsules were recovered by the conventional procedure. The microcapsules thus obtained changed color reversibly from black to colorless or vice versa, the transition temperature being 40° C. The condition of the microencapsulation reaction system and the average particle size, heat resistance and pressure resistance of the microcapsules were investigated. The results are shown in Table 1.

Example 2

Three (3) grams of vinyltoluenesulfonic acid-maleic anhydride copolymer (mol. wt. ca. 25000) and 2 g of methyl vinyl ether-maleic anhydride copolymer (mol. wt. ca. 350000) were dissolved in 95 g of water with stirring at 70° C. for 2 hours. This solution showed a pH value of 2.4. Then, 20% aqueous sodium hydroxide solution was gradually added to bring the pH of the solution to 4.0 (Solution A). On the other hand, 4 g of crystal violet lactone and 8 g of bisphenol A were dissolved in a mixture of 40 g of myristyl alcohol and 40 g of lauryl laurate with stirring at 100° C. (Solution B). On the other hand, 6 g of melamine was dissolved in 15 g of 37% formalin with stirring at 70° C. (Solution C).

Then, Solution B was added to Solution A at 70° C. and the mixture was emulsified with stirring until fine droplets were obtained. To this emulsion was added Solution C, the wall precursor material, in small portions. The mixture showed a pH value of 5.0. The mixture was further stirred at 70° C. for 1 hour and, then, cooled gradually to room temperature to provide a microcapsule dispersion. The microcapsules were recovered by the conventional procedure. The microcapsules thus obtained changed color reversibly from blue to colorless or vice versa, the transition temperature being 15° C. The condition of the microencapsulation reaction system and the average particle size, heat resistance and pressure resistance of the microcapsules were investigated. The results are shown in Table 1.

Example 3

Five (5) grams of vinyltoluenesulfonic acid-maleic anhydride sodium copolymer (mol. wt. ca. 25000) and 2.1 g of methyl vinyl ether-maleic anhydride copolymer (mol. wt. ca. 100000) were dissolved in 92.9 g of water with stirring at 70° C. for 2 hours. The solution showed a pH value of 4.8. Then, acetic acid was gradually added to bring the pH of the solution to 4.0 (Solution A). On the other hand, 2.5 g of 3-diethylamino-6-methyl-7-chlorofluoran and 5 g of bisphenol Z were dissolved in 90 g of myristic acid with stirring at 120° C. (Solution B).

Then, Solution B was added to Solution A at 70° C. and the mixture was emulsified with stirring until fine droplets were obtained. To this emulsion was added 20 g of methylated methylolmelamine precondensate (Sumirez 613, Sumitomo Chemical Company, Ltd.) as the wall precursor material, in small portions. The mixture showed a pH value of 5.0. The mixture was further stirred at 70° C. for 2 hour, after which it was gradually cooled to room temperature to provide a microcapsule dispersion. Then, the microcapsules were recovered by the conventional procedure. The resultant microcapsules changed color reversibly from red to colorless or vice versa, the transition temperature being 50° C. The condition of the microencapsulation reaction system and the average particle size, heat resistance and pressure resistance of the microcapsules were investigated. The results are shown in Table 1.

Example 4

First, 4.2 g of vinyltoluenesulfonic acid-maleic anhydride copolymer (mol. wt. ca. 80000) and 0.8 g of methyl vinyl ether-maleic anhydride copolymer (mol. wt. ca. 100000) were dissolved in 95 g of water with stirring at 70° C. for 2 hours. The solution showed a pH value of 2.2. Then, 20% aqueous sodium hydroxide solution was gradually added to bring the pH of the system to 4.0 (Solution A). On the other hand, 1 g of 1,3,3-trimethyl-spiroindolinenaphthoxazine was dissolved in 50 g of dipropylnaphthalene with stirring (Solution B). Furthermore, 4 g of melamine was dissolved in 12 g of 37% formalin with stirring at 70° C. (Solution C).

Then, Solution B was added to Solution A at 70° C. and the mixture was emulsified with stirring until fine droplets were obtained. To this emulsion was added Solution C, the wall precursor material, in small portions. The mixture showed a pH value of 4.7. The mixture was further stirred at 70° C. for 1 hour, after which it was gradually cooled to room temperature to provide a microcapsule dispersion. Then, the microcapsules were recovered by the conventional procedure. The mean size of the microcapsules was 2.2 µm. They were colorless in the dark but became blue in sunlight, thus showing a definite photochromism. The condition of the microencapsulation reaction system and the average particle size, heat resistance and pressure resistance of the microcapsules were investigated. The results are shown in Table 1.

Example 5

First, 2.6 g of vinyltoluenesulfonic acid-maleic anhydride copolymer (mol. wt. ca. 80000) and 2.4 g of methyl vinyl ether-maleic anhydride copolymer (mol. wt. ca. 100000) were dissolved in 95 g of water with stirring at 70° C. for 2 hours. The solution showed a pH value of 2.5. Then, 20% aqueous sodium hydroxide solution was gradually added to bring the pH of the solution to 4.0 (Solution A).

Then, at 70° C., 50 g of a liquid crystal system consisting in a 1:1:1 (w/w) mixture of compounds of the following formulas was gradually added to Solution A and the mixture was emulsified with stirring until fine droplets were obtained.

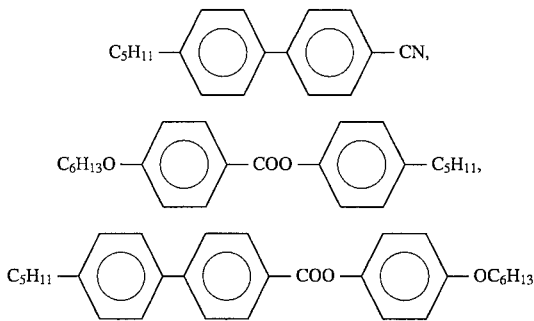

To this emulsion was added 10 g of methylated methylolmelamine precondensate (Sumirez 613, Sumitomo Chemical Company, Ltd.), the wall precursor material, in small portions. The mixture showed a pH value of 4.8. The mixture was further stirred at 60° C. for 3 hour, after which it was cooled gradually to room temperature to provide a microcapsule dispersion. Then, the microcapsules were recovered by the conventional procedure. The mean size of the microcapsules was 2.8 µm. The microcapsules were centrifuged and admixed with 10% aqueous solution of polyvinyl alcohol and a black film was printed with this mixture using a 150-mesh screen, followed by drying. This film changed color from red to orange to yellow to green to blue in the temperature region of 30°~33° C. The condition of the microencapsulation reaction system and the average particle size, heat resistance and pressure resistance of the microcapsules were investigated. The results are shown in Table 1.

Comparison Example 1

The microencapsulation procedure of Example 1 was repeated except that vinyltoluenesulfonic acid-maleic anhydride copolymer (mol. wt. ca. 45000) alone was used in an amount of 5 grams as the system modifier. The condition of the microencapsulation reaction system and the average particle diameter, heat resistance and pressure resistance of the resultant microcapsules are shown in Table 1.

Comparison Example 2

The microencapsulation procedure of Example 1 was repeated except that methyl vinyl ether-maleic anhydride copolymer (mol. wt. ca. 100000) alone was used in an amount of 5 grams as the system modifier. The condition of the microencapsulation reaction system and the average particle diameter, heat resistance and pressure resistance of the resultant microcapsules are shown in Table 1.

Comparison Example 3

The microencapsulation procedure of Example 1 was repeated except that ethylene-maleic anhydride copolymer (mol. wt. ca. 74000) alone was used in an amount of 5 grams as the system modifier. The condition of the microencapsulation reaction system and the average particle diameter, heat resistance and pressure resistance of the resultant microcapsules are shown in Table 1.

Comparison Example 4

The microencapsulation procedure of Example 1 was repeated except that styrene-maleic anhydride copolymer (mol. wt. ca. 350000) alone was used in an amount of 5 grams as the system modifier. The condition of the microencapsulation reaction system and the average particle diameter, heat resistance and pressure resistance of the resultant microcapsules are shown in Table 1.

Comparison Example 5

The microencapsulation procedure of Example 1 was repeated except that polystyrenesulfonic acid (mol. wt. ca. 500000) alone was used in an amount of 5 grams as the system modifier. The condition of the microencapsulation reaction system and the average particle diameter, heat resistance and pressure resistance of the resultant microcapsules are shown in Table 1.

Comparison Example 6

The microencapsulation procedure of Example 1 was repeated except that 2 g of vinyltoluenesulfonic acid-maleic anhydride copolymer (mol. wt. ca. 45000) and 3 g of methyl vinyl ether-maleic anhydride copolymer (mol. wt. ca. 100000) were used as the system modifier. The condition of the microencapsulation reaction system and the average particle diameter, heat resistance and pressure resistance of the resultant microcapsules are shown in Table 1.

Comparison Example 7

The microencapsulation procedure of Example 1 was repeated except that 4.7 g of vinyltoluenesulfonic acid-maleic anhydride copolymer (mol. wt. ca. 45000) and 0.3 g of methyl vinyl ether-maleic anhydride copolymer (mol. wt. ca. 100000) were used as the system modifier. The condition of the microencapsulation reaction system and the average particle diameter, heat resistance and pressure resistance of the resultant microcapsules are shown in Table 1.

Comparison Example 8

The microencapsulation procedure of Example 1 was repeated except that 2.5 g of ethylene-maleic anhydride copolymer (mol. wt. ca. 74000) and 2.5 g of styrene-maleic anhydride copolymer (mol. wt. ca. 350000) were used as the system modifier. The condition of the microencapsulation reaction system and the average particle diameter, heat resistance and pressure resistance of the resultant microcapsules are shown in Table 1.

Comparison Example 9

The microencapsulation procedure of Example 1 was repeated except that 2.5 g of ethylene-maleic anhydride copolymer (mol. wt. ca. 74000) and 2.5 g of polystyrenesulfonic acid (mol. wt. ca. 500000) were used as the system modifier. The condition of the microencapsulation reaction system and the average particle diameter, heat resistance and pressure resistance of the resultant microcapsules are shown in Table 1.

Comparison Example 10

The microencapsulation procedure of Example 1 was repeated except that 3.0 g of vinyltoluenesulfonic acid-maleic anhydride copolymer (mol. wt. ca. 25000) and 2.0 g of styrene-maleic anhydride copolymer (mol. wt. ca. 350000) were used as the system modifier. The condition of the microencapsulation reaction system and the average particle diameter, heat resistance and pressure resistance of the resultant microcapsules are shown in Table 1.

TABLE 1

| | System modifier | Condition of microencapulation reaction system | Mean diameter of capsules (μm) | Heat resistance of capsules (%) | Pressure resistance of capsules (%) |
|---|---|---|---|---|---|
| Example 1 | A:B = 80:20 | Good | 2.7 | 98.5 | 97.7 |
| Example 2 | A:B = 60:40 | Good | 2.9 | 97.3 | 97.5 |
| Example 3 | A:B = 70:30 | Good | 2.5 | 96.9 | 98.3 |
| Comparison Example 1 | A alone | Good | 16.3 | 67.4 | 32.1 |
| Comparison | B alone | Gelation | 7.5 | 36.8 | 53.9 |

TABLE 1-continued

| | System modifier | Condition of microencapulation reaction system | Mean diameter of capsules (μm) | Heat resistance of capsules (%) | Pressure resistance of capsules (%) |
|---|---|---|---|---|---|
| Example 2 | | tendency | | | |
| Comparison Example 3 | Ethylene-maleic anhydride copolymer | Gelation tendency | 12.1 | 74.5 | 29.7 |
| Comparison Example 4 | Styrene-maleic anhydride copolymer | Gelation tendency | 4.7 | 27.0 | 68.2 |
| ComDarison Example 5 | Polystyrene-sulfonic acid | Good | 5.3 | 50.9 | 48.6 |
| Comparison Example 6 | A:B = 40:60 | Gelation tendency | 8.5 | 43.8 | 38.4 |
| Comparison Example 7 | A:B = 94:6 | Good | 10.8 | 66.5 | 33.0 |
| Comparison Example 8 | Ethylene-maleic anhydride copolymer styrene-maleic anhydride copolymer | Gelation tendency | 4.8 | 29.3 | 66.5 |
| Comparison Example 9 | Ethylene-maleic anhydride copolymer Polystyrene-sulfonic acid | Gelation tendency | 6.2 | 45.4 | 53.1 |
| Comparison Example 10 | A Styrene-maleic anhydride copolymer | Gelation tendency | 9.3 | 35.2 | 33.8 |

The results shown in Table 1 can be recapitulated as follows. According to Comparison Example 1 in which Copolymer A is the sole anionic macromolecular electrolyte, poor emulsification results in a remarkably increased particle size and decreased pressure resistance of microcapsules. In Comparison Example 2 where only Copolymer B is employed, the microencapsulation system undergoes gelation to lower the wall-forming power so that the resultant microcapsules are not only increased in particle size but also are deficient in heat resistance.

In Comparison Examples 3–5 where neither of the anionic macromolecular electrolytes of this invention is employed, too, poor emulsification and poor wall-forming actions lead to a failure to achieve sufficient pressure resistance and heat resistance.

It is also obvious that even in Comparison Examples 6 and 7 where the two anionic macromolecular electrolytes of this invention are used in combination, more or less the same unsatisfactory results as in Comparison Examples 1–5 are obtained because the ratios of said electrolytes are outside the range of this invention. In Comparison Examples 8–10 where at least one component of the combination is not an anionic macromolecular electrolyte of this invention, gelation is inevitable.

In contrast, in Examples 1–5 of this invention where Copolymers A and B are used together within the specified range of combination, the microcapsules are small and uniform in size and highly resistant to heat and pressure.

We claim:

1. A microencapsulation process comprising emulsifying a hydrophobic core material in an aqueous solution of an anionic macromolecular electrolyte system, adding a melamine-formaldehyde precondensate thereto, stirring and polymerizing the precondensate to encapsulate the hydrophobic core material with a melamine-formaldehyde polycondensate resin, said aqueous solution of anionic macromolecular electrolyte system comprising a combined concentration of 1–20% by weight of (A) vinyltoluenesulfonic acid-maleic anhydride copolymer and (B) methyl vinyl ether-maleic anhydride copolymer in a weight ratio A:B of 50:50–90:10.

2. The microencapsulation process according to claim 1 wherein said vinyltoluenesulfonic acid-maleic anhydride copolymer (A) has a molecular weight of 5000–500000 and said methyl vinyl ether-maleic anhydride copolymer (B) has a molecular weight of 10000–500000.

3. The microencapsulation process according to claim 2 where the molecular weight of vinyltoluenesulfonic acid-maleic anhydride copolymer (A) is 10000–400000 and that of methyl-vinyl ether-maleic anhydride copolymer (B) is 20000–400000.

4. The microencapsulation process according to claim 1 wherein said weight ratio A:B is 60:40–80:20.

5. The microencapsulation process according to claim 1 wherein said concentration of anionic macromolecular electrolytes is 2–15 weight %.

* * * * *